US008789883B2

(12) United States Patent
Itou et al.

(10) Patent No.: US 8,789,883 B2
(45) Date of Patent: Jul. 29, 2014

(54) CUSHION STRUCTURE OF VEHICLE SEAT AND METHOD FOR PRODUCING THE SAME

(75) Inventors: Hidehiro Itou, Aichi-ken (JP); Yasuhiko Niimi, Handa (JP)

(73) Assignees: Toyota Boshoku Kabushiki Kaisha, Aichi-Ken (JP); Denso Corporation, Aichi-Pref (JP)

( * ) Notice: Subject to any disclaimer, the term of this patent is extended or adjusted under 35 U.S.C. 154(b) by 361 days.

(21) Appl. No.: 12/606,573

(22) Filed: Oct. 27, 2009

(65) Prior Publication Data

US 2010/0102599 A1    Apr. 29, 2010

(30) Foreign Application Priority Data

Oct. 29, 2008    (JP) .................... 2008-277932

(51) Int. Cl.
*A47C 7/74*    (2006.01)
(52) U.S. Cl.
USPC ............. 297/180.14; 297/180.1; 297/180.13; 297/452.57
(58) Field of Classification Search
USPC .............. 297/180.1, 180.13, 180.14, 452.29, 297/452.55, 452.57, DIG. 1, DIG. 2
See application file for complete search history.

(56) References Cited

U.S. PATENT DOCUMENTS

| | | | | |
|---|---|---|---|---|
| 3,531,552 A | * | 9/1970 | Getz et al. | 264/46.7 |
| 4,115,170 A | * | 9/1978 | Sanson | 156/79 |
| 5,017,115 A | * | 5/1991 | Yanagishita et al. | 425/125 |
| 6,786,541 B2 | * | 9/2004 | Haupt et al. | 297/180.1 |
| 6,848,742 B1 | | 2/2005 | Aoki et al. | |
| 7,108,319 B2 | * | 9/2006 | Hartwich et al. | 297/180.1 |
| 2006/0214480 A1 | * | 9/2006 | Terech | 297/180.13 |
| 2007/0241604 A1 | * | 10/2007 | Saitou et al. | 297/452.26 |
| 2009/0134675 A1 | * | 5/2009 | Pfahler | 297/180.1 |
| 2009/0152931 A1 | | 6/2009 | Sahashi | |

FOREIGN PATENT DOCUMENTS

| | | |
|---|---|---|
| JP | 10-24793 | 1/1998 |
| JP | 2003-285628 | 10/2003 |
| JP | 2004-8334 | 1/2004 |
| JP | 2004-313491 | 11/2004 |
| JP | 2005-95342 | 4/2005 |
| JP | 2005-238675 | 9/2005 |
| WO | WO2007/012477 | * 2/2007 |

OTHER PUBLICATIONS

English language Abstract of JP 2004-8334, Jan. 15, 2004.
Japan Office Action dated Feb. 26, 2013 with English language translation.

* cited by examiner

*Primary Examiner* — Philip Gabler
(74) *Attorney, Agent, or Firm* — Greeblum Bernstein P.L.C.

(57) ABSTRACT

A cushion structure of a vehicle seat is provided. The cushion structure includes a cushion pad formed of expanded resin and configuring a cushion part of the vehicle seat, the cushion pad being provided with a groove part, and a reinforcing sheet material which is harder than the cushion pad and is provided integrally with an upright wall face of the groove part.

1 Claim, 5 Drawing Sheets

CUSHION STRUCTURE OF VEHICLE SEAT AND METHOD FOR PRODUCING THE SAME

CROSS-REFERENCE TO RELATED APPLICATION

The present application claims priority under 35 U.S.C. §119 to Japanese Patent Application No. 2008-277932, filed on Oct. 29, 2008. The contents of this application are incorporated herein by reference in their entirety.

BACKGROUND OF THE INVENTION

1. Field of the Invention

The present invention relates to a cushion structure of a vehicle seat and a method for producing the same.

2. Description of the Related Art

A vehicle seat having an air blower provided in a back part of a seat back for supplying air to a back of a sitting person has been known. For example, JP-A-2004-8334 describes a structure in which air supplied from an air blower is distributed to various sections through air distributing grooves which are formed in a cushion pad of the seat back, and further, the distributed air is blown off from blow-off holes connected from these air distributing grooves to a back face of the sitting person.

Specifically, the air distributing grooves are formed as dented passages in a back part of the cushion pad, and adapted to distribute the air supplied from the air blower in various directions inside the back part along passage shapes of the grooves. The blow-off holes for blowing off the distributed air to the back of the sitting person are formed to penetrate the cushion pad at various positions in these air distributing grooves.

However, in the above configuration, since the air distributing grooves are formed in a dented shape in the cushion pad having a soft structure, the grooves may be collapsed with a load of pressure when the sitting person leans back against the seat back, and air distributing function might become not sufficient.

SUMMARY OF THE INVENTION

According to an aspect of the present invention, there is provided a cushion structure for vehicle seat which prevents or reduces grooves formed in a dented shape in a cushion pad from being collapsed with a load of pressure when a person sits thereon or the like.

According to an exemplary embodiment of the present invention, there is provided a cushion structure of a vehicle seat, comprising: a cushion pad formed of expanded resin and configuring a cushion part of the vehicle seat, the cushion pad being provided with a groove part; and a reinforcing sheet material which is harder than the cushion pad and is provided integrally with an upright wall face of the groove part.

According to another exemplary embodiment of the preset invention, there is provided a method for producing a cushion structure of a vehicle seat having a cushion pad formed of expanded resin and configuring a cushion part of the vehicle seat, the cushion pad being provided with a groove part, the method comprising: attaching a reinforcing sheet material having a shape of flexible sheet to be integrally hardened by impregnation of the expanded resin of the cushion pad when the cushion pad is molded by expansion, to a mold for molding the cushion pad; and molding the cushion pad by expansion from expandable resin material in the mold, to which the reinforcing sheet material is attached at the attaching step. The reinforcing sheet material attached to the mold at the attaching step is formed with a cut for enabling a vertical face part of the reinforcing sheet material to be folded and abut an upright wall face of a projected part formed in the mold for forming the groove part in the cushion pad. In a state where the vertical face part of the reinforcing sheet material abuts the upright wall face of the projected part of the mold, the cushion pad is molded by expansion in the molding step, whereby the vertical face part of the reinforcing sheet material abuts the upright wall face of the groove part formed in the cushion pad, and is integrally hardened.

DETAILED DESCRIPTION

Figure 1:
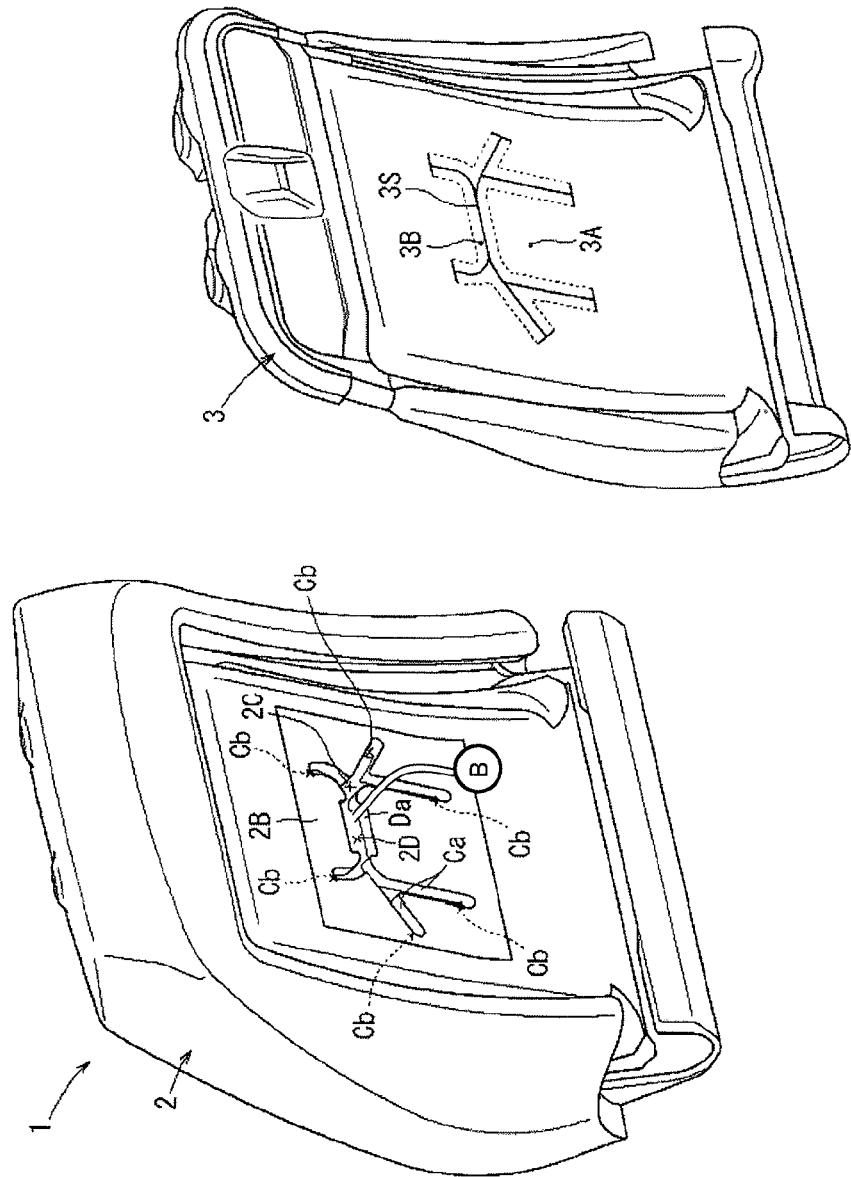
FIG. 1 is a schematic view showing a cushion structure of a vehicle seat according to an exemplary embodiment.

Hereinafter, a cushion structure of a vehicle seat and a method for producing the same according to exemplary embodiments of the present invention will be described with reference to FIGS. 1 to 5. As shown in FIG. 1, this cushion structure is configured as a cushion structure of a seat back 1 of a vehicle seat, and includes a cushion pad 2 formed of expanded resin as a cushion part, and a thick non-woven fabric 3 having a shape of flexible sheet which is provided to a back face part 2B of the cushion pad 2 by integral molding. As described later, the thick non-woven fabric 3 is hardened to be harder than the cushion pad 2. The thick non-woven fabric 3 in this exemplary embodiment functions as a reinforcing sheet material. It is noted that the reinforcing sheet material which is molded to the cushion pad 2 is not limited to the non-woven fabric 3.

The cushion pad 2 is formed of expanded polyurethane resin, and is formed so as to softly receive a leaning load of a sitting person leaning back against the seat back 1 by elastic deformation of the cushion pad itself. The back face part 2B of the cushion pad 2 opposite to a front face part for receiving the leaning load of a sitting person is formed with air distributing grooves 2C having a dented shape which function as passages for distributing air supplied from back side by an air blower (not shown).

A plurality of air distributing grooves 2C are formed so as to extend in various directions inside the back face part 2B from a connecting hole 2D which has a concave shape and is connected to an air blowing pipe for supplying the air from the air blower. Blow-off holes Cb penetrating to the front face side of the cushion pad 2 are formed at respective end parts of the air distributing grooves 2C extending in various directions. According to this structure, the air supplied to the connecting hole 2D passes through the air distribution grooves 2C, and the supplied air is distributed to various sections inside the back face part 2B of the cushion pad 2, and sent from the respective blow-off holes Cb to the front face side of the cushion pad 2. Accordingly, the air is dispersed in a wide range to be blown toward the back of the sitting person.

The air distributing grooves 2C and the connecting hole 2D in this exemplary embodiment respectively function as a groove part.

Although not shown in the drawing, the cushion pad 2 is covered with a facing cover formed of cloth all over an outer peripheral face thereof. This facing cover is formed of breathable cloth material and adapted to breathe the air which is blown off from the blow-off holes Cb. Moreover, although also not shown in the drawing, a sheet member is provided to the back face part 2B of the cushion pad 2 so as to cover the air distributing grooves 2C and prevent the air passing through the air distributing grooves 2C from leaking to the exterior from the back face part 2B of the cushion pad 2. Further, a wooden back board is bonded to the back face part 2B of the cushion pad 2 above the sheet member.

Therefore, when the leaning load of the sitting person is exerted on the cushion pad 2 having the soft structure as described above, the air distributing grooves 2C and the connecting hole 2D might be collapsed with flexing deformation of the cushion pad 2, and the air distributing function might become not sufficient. In response, in this exemplary embodiment, in order to make the air distributing grooves 2C and the connecting hole 2D unlikely to be collapsed, the thick non-woven fabric 3 for reinforcing upright wall faces Ca, Da of the air distributing grooves 2C and the connecting hole 2D is integrally hardened and formed with the back face part 2B of the cushion pad 2.

In this exemplary embodiment, known thick filament non-woven fabric (TAFNEL, a product of MITSUI CHEMICALS, INC.: registered trade mark) which is formed of polypropylene by spunbond method is used as the thick non-woven fabric 3. This thick non-woven fabric 3 is applied all over the back face part 2B of the cushion pad 2 and attached when the cushion pad 2 is molded by expansion, so that the thick non-woven fabric 3 is integrally bonded to the back face part 2B of the cushion pad 2 with the expansion molding of the cushion pad 2, and hardened (See FIG. 5).

Specifically, when the cushion pad 2 is molded by expansion, the thick non-woven fabric 3 is integrally bonded to the cushion pad 2 since the expanded resin is impregnated between the filaments thereof and hardened, whereby the integrated face part is hardened. In this exemplary embodiment, as shown in FIG. 1, the thick non-woven fabric 3 is formed with slits (cuts) 3S according to a shape of the air distributing grooves 2C, in a lateral face part 3A to abut the back face part 2B of the cushion pad 2.

By forming the slits 3S, there are formed vertical face parts 3B which can be folded from the lateral face part 3A of the thick non-woven fabric 3 so as to abut the upright wall faces Ca, Da of the air distributing grooves 2C and the connecting hole 2D. When the cushion pad 2 is molded by expansion, the vertical face parts 3B are set so as to abut the upright wall faces Ca, Da of the air distributing grooves 2C and the connecting hole 2D, and integrally bonded to the upright wall faces Ca, Da, whereby these faces are brought into a hardened state.

Next, a production method for integrally bonding the thick non-woven fabric 3 to the cushion pad 2 and molding the fabric along with the expansion molding of the cushion pad 2 will be described. In the following description, for easy understanding of this production method, the thick non-woven fabric 3, the cushion pad 2 and a mold 10 will be described in a simplified form as shown in FIGS. 2 to 4.

Figure 2:
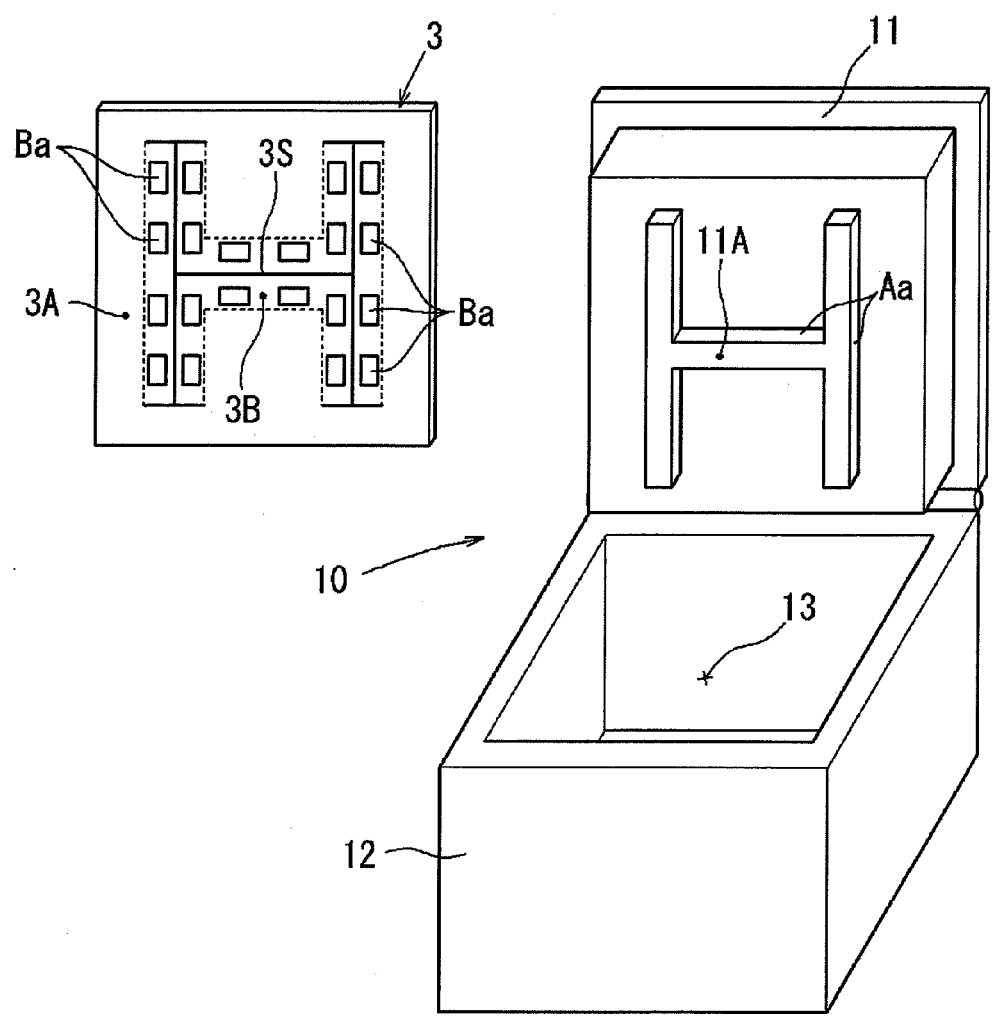
FIG. 2 is a schematic view showing structures of non-woven fabric and a mold in a simplified form.
Figure 3:
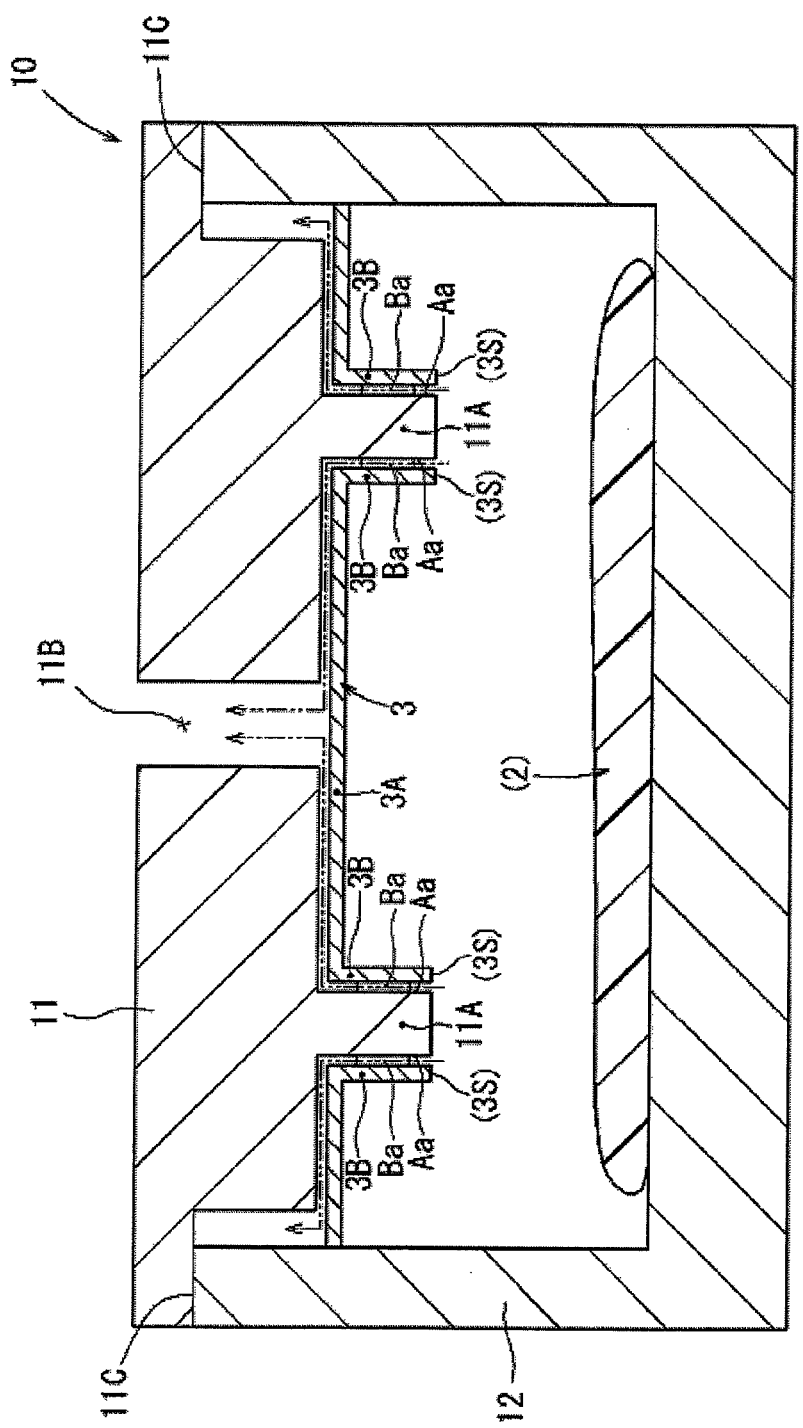
FIG. 3 is a process chart showing a closed state of the mold.
Figure 4:
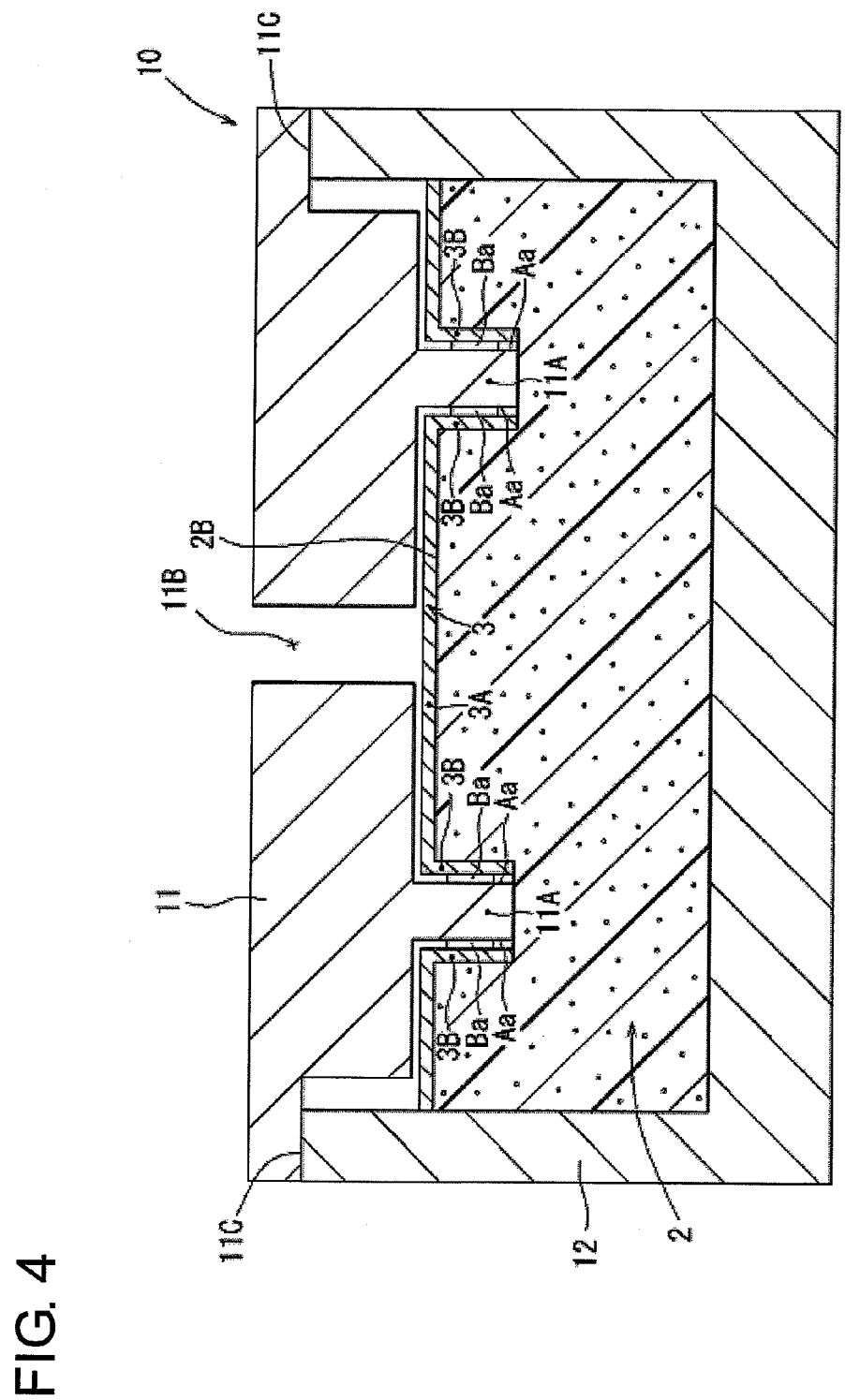
FIG. 4 is a process chart showing a state where a cushion pad is molded by expansion inside the mold.

The mold 10 includes an upper mold 11 as a male mold and a lower mold 12 as a female mold as shown in FIGS. 2 and 3. A cavity 13 having a shape for expansion molding the cushion pad 2 is defined between these molds 11, 12 which are closed.

The upper mold 11 is provided with projected parts 11A for forming the air distributing grooves 2C and the connecting hole 2D of the cushion pad 2 in a dented shape. The vertical face parts 3B of the thick non-woven fabric 3, which are folded from the lateral face part 3A abut upright wall faces Aa of the projected parts 11A. Specifically, magnets Ba are attached to the vertical face parts 3B, and by attaching these magnets Ba to the upright wall faces Aa of the projected parts 11A, the vertical face parts 3B can be held in a state of abutting the upright wall faces Aa of the projected parts 11A.

Therefore, when the cushion pad 2 is molded by expansion, at first, the thick non-woven fabric 3 is set to the upper mold 11 to be held in a state where the vertical face parts 3B abut the upright wall faces Aa of the projected parts 11A (an attaching step). Then, expandable resin material for the cushion pad 2 is injected into the cavity space 13 in the lower mold 12 and the mold 10 is closed (See FIG. 3). Thereafter, by expanding the expandable resin material from this state with heat (a molding process), the expandable resin material is expanded and widely filled in the cavity space 13, and formed into the shape of the cushion pad 2 as shown in FIG. 4.

During this course, as shown in FIG. 3, along with the expansion of the expandable resin material, gas which is filled in the cavity space 13 can be discharged to an exterior of the mold 10, from gaps of the slits 3S formed in the thick non-woven fabric 3, through a gap 11C in a mated part between the upper mold 11 and the lower mold 12, and a gas discharge hole 11B formed in the upper mold 11. Therefore, the expandable resin material can be filled entirely in the cavity space 13 without leaving gas which may cause defective expansion, so that the thick non-woven fabric 3 set at an upper face of the cavity space 13 can be favorably impregnated with the expandable resin material (expanded resin) to be bonded (molded) integrally, as shown in FIG. 4.

Figure 5:
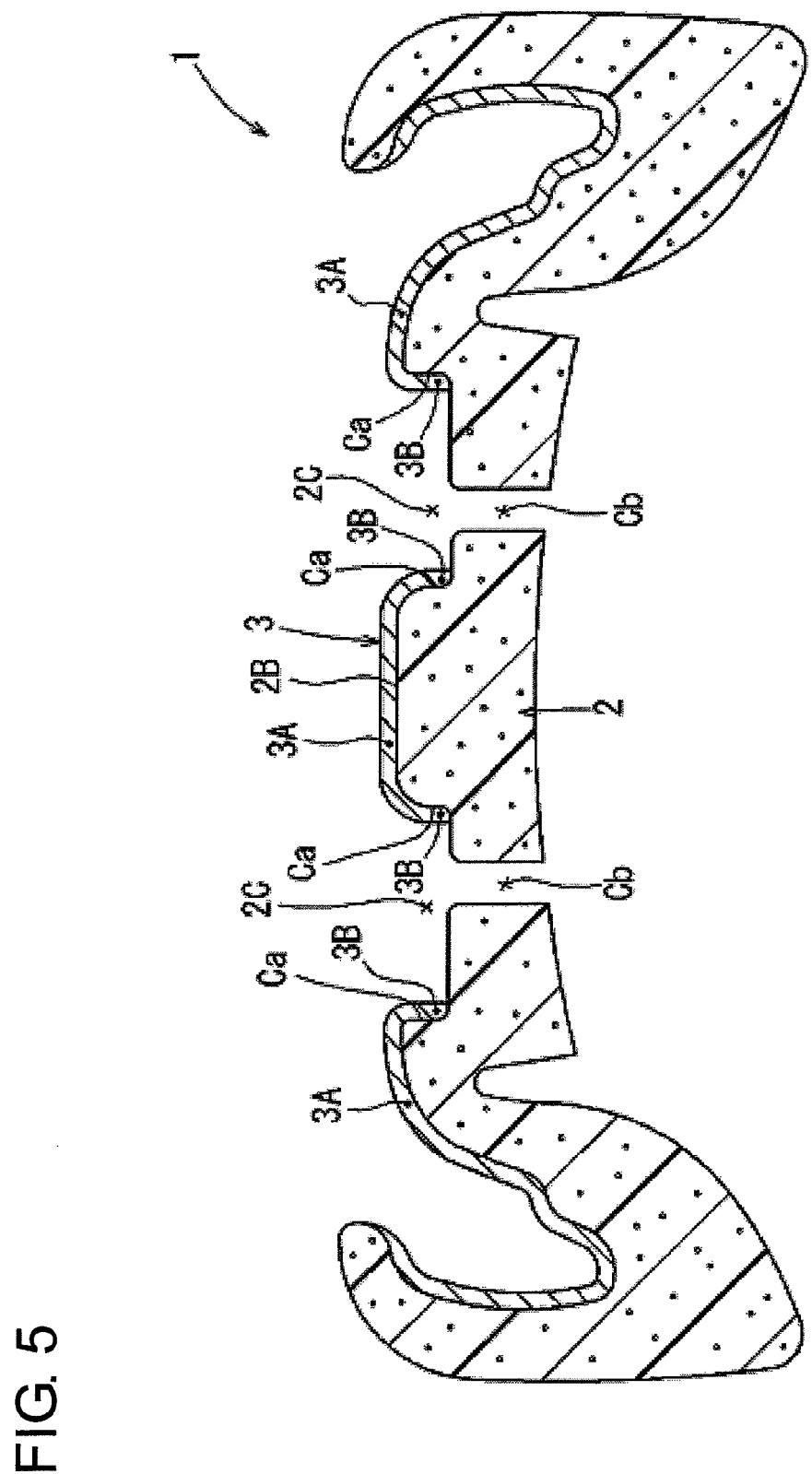
FIG. 5 is a sectional view showing a shape of the cushion pad after molding.

In thus molded cushion pad 2, the lateral face part 3A of the thick non-woven fabric 3 abuts the back face part 2B, and the vertical face parts 3B abut the upright wall faces Ca, Da of the air distributing grooves 2C and the connecting hole 2D as shown in FIG. 5. The respective abutting parts are hardened by integral molding with impregnation of the expandable resin material (expanded resin).

According to the cushion structure of the vehicle seat and the method of producing the cushion structure in this exemplary embodiment, the upright wall faces Ca, Da of the air distributing grooves 2C and the connecting hole 2D are formed hard with the thick non-woven fabric 3 molded integrally. In other words, the thick non-woven fabric 3 which is harder than the cushion pad 2 is provided integrally with the upright wall surfaces Ca, Da of the air distributing grooves and the connecting hole 2D. Accordingly, the air distributing grooves 2C become less likely to collapse, even though the load exerted on the cushion pad 2 from a sitting person. Accordingly, the air distributing grooves 2C are prevented from being collapsed, so that the air distributing grooves 2C can efficiently function.

Moreover, the thick non-woven fabric 3 formed as a cloth material having a shape of flexible sheet can be flexibly changed in shape according to shapes of the upright wall faces Ca, Da of the air distributing grooves 2C and the connecting hole 2D. Therefore, the thick non-woven fabric 3 can favorably abut the upright wall faces Ca, Da of the air distributing grooves 2C and the connecting hole 2D to be integrally hardened therewith. Accordingly, it is possible to form the upright wall faces Ca, Da of the air distributing grooves 2C and the connecting hole 2D favorably by integral hardening.

Moreover, the vertical face parts 3B of the thick non-woven fabric 3 which abut the upright wall faces Ca, Da of the air distributing grooves 2C and the connecting hole 2D are formed by being folded from the lateral face part 3A which abuts the back face part 2B of the cushion pad 2. Accordingly, the upright wall faces Ca, Da of the air distributing grooves 2C and the connecting hole 2D, and the back face part 2B of the cushion pad 2 adjacent to these upright wall faces Ca, Da are hardened together, and therefore, the air distributing grooves 2C becomes less likely to collapse. Further, since the vertical face parts 3B and the lateral face part 3A are formed continuously, the upright wall faces Ca, Da become less likely to fall sideways. Accordingly, the air distributing grooves 2C becomes further less likely to collapse.

Moreover, since the vertical face parts 3B are formed by providing the cuts (the slits 3S) in the thick non-woven fabric 3, it is possible to form the vertical face parts 3B by folding the thick non-woven fabric 3 from lines of the cuts, even in case where the air distributing grooves 2C are arranged in other place than the peripheral edge of the thick non-woven fabric 3. Therefore, it is possible to form the upright wall faces Ca, Da of the air distributing grooves 2C and the connecting hole 2D by being favorably hardened.

Moreover, the upright wall faces Ca, Da of the air distributing grooves 2C and the connecting hole 2D which are formed in the back face part 2B of the cushion pad 2 in the molding step after the attaching step are formed by integral molding with the vertical face parts 3B of the thick non-woven fabric 3 by impregnation. These vertical face parts 3B of the thick non-woven fabric 3 are folded along lines of the cuts in the thick non-woven fabric 3 in the attaching step, and abut the upright wall faces Aa of the projected parts 11A of the mold 10 to be attached thereto. Moreover, since these vertical face parts 3B are members having a shape of flexible sheet, their shape can be flexibly changed according to the shapes of the upright wall faces Ca, Da of the air distributing grooves 2C and the connecting hole 2D when the cushion pad 2 is molded by expansion. Therefore, it is possible to integrally mold the vertical face parts 3B by favorably abutting them against the upright wall faces Ca, Da of the air distributing grooves 2C and the connecting hole 2D of the cushion 2 in the molding step.

Moreover, the thick non-woven fabric 3 abuts the upright wall faces Ca, Da of the air distributing grooves 2C and the connecting hole 2D and the back face part 2B of the cushion pad 2 adjacent to these upright wall faces Ca, Da, and are integrally molded together by impregnation and hardened. Accordingly, the upright wall faces Ca, Da become less likely to fall sideways, and it is possible to form the air distributing grooves 2C to be less likely to collapse by the above described molding. Further, the thick non-woven fabric 3 is formed with the cuts (the slits 3S) for forming the vertical face parts 3B. The cuts can function so that the gas generated by the expansion may leak through these cutting lines, when the cushion pad 2 is molded by expansion.

While the present invention has been shown and described with reference to certain exemplary embodiments thereof, it will be understood by those skilled in the art that various changes in form and details may be made therein without departing from the spirit and scope of the invention as defined by the appended claims.

For example, in the above-described exemplary embodiment, the grooves formed in the back face part of the cushion pad are used as the air distributing grooves 2C. However, the present invention is not limited thereto. The grooves may be for containing any functional components or may have any function with using their dented shape. Further, the grooves may be formed in the front face part for receiving a leaning load of a sitting person instead of the back face part of the cushion pad.

It is also possible to form grooves in the back face part of the cushion pad of the seat cushion and integrally provide a reinforcing sheet material which is harder than the cushion pad for reinforcing the upright wall faces of the grooves. Although in the above-described exemplary embodiment, the slits 3S (the cuts) are formed in the lateral face part 3A of the thick non-woven fabric 3 (the reinforcing sheet material) for enabling the vertical face parts 3B to be formed by folding, the vertical face parts may be formed by folding the peripheral edge of the reinforcing sheet material if the grooves are arranged in the peripheral edge part of the reinforcing sheet material.

Moreover, the magnets Ba are employed as means for attaching the vertical face parts 3B of the thick non-woven fabric 3 (the reinforcing sheet material) to the upright wall faces Aa of the projected parts 11A of the mold 10, it is also possible to make them fixed to each other by magnetizing the mold and providing metal pieces such as a core member of a stapler on the vertical face parts of the reinforcing sheet material. Further, as the attaching means, it is possible to employ an adhesive function using an adhesive sheet or the like, a hooking structure by a hook, or other any attaching means.

Further, material of the reinforcing sheet material for hardening the back face part of the cushion pad is not particularly limited. For example, it is also possible to harden the upright wall faces of the grooves, by bonding resin sheet material which is harder than the cushion pad to the upright wall faces. Moreover, although the case where the upright wall faces of the grooves are hardened is described above, it is also possible to harden bottom faces of the grooves too.

It is noted that in the present invention, upright wall faces of the grooves or hole to which a reinforcing sheet material is provided is not limited to a face which is perpendicular to the bottom face of the grooves. The upright wall faces may be a part of circular shape and inclined with respect to the bottom face of the grooves.

What is claimed is:
1. A cushion structure of a vehicle seat, comprising:
a cushion pad formed of expanded resin and configuring a cushion part of the vehicle seat, the cushion pad including a front face part comprising an occupant receiving side and a back face part formed with a groove part; and
a reinforcing sheet material which is harder than the cushion pad and is provided on the back face part of the cushion pad,
wherein the reinforcing sheet material is provided integrally with the cushion pad by integral molding in which the reinforcing sheet is set in a mold at an expansion molding of the cushion pad, thereby being impregnated with expandable resin and hardened,
wherein the groove part includes a connecting hole which is connected to an air blower, and an air distributing groove for distributing air supplied to the connecting hole in a surface direction in the back face part of the cushion pad,
wherein a blow-off hole is formed at an end part of the groove part and penetrates the cushion pad,
wherein the reinforcing sheet material is formed of a single cloth material in a shape of a flexible sheet and includes a lateral face part which is formed while abutting the back face part of the cushion pad and integrally hardened therewith, and a vertical face part which is formed while abutting an upright wall face of the connecting hole and an upright wall face of the air distributing groove by being cut and bent from the lateral face part and integrally hardened therewith.

* * * * *